United States Patent [19]
Ueda

[11] Patent Number: 5,915,043
[45] Date of Patent: Jun. 22, 1999

[54] IMAGE REPRODUCING APPARATUS

[75] Inventor: Hiroaki Ueda, Tokyo, Japan

[73] Assignee: NEC Corporation, Tokyo, Japan

[21] Appl. No.: 08/626,391

[22] Filed: Mar. 29, 1996

[51] Int. Cl.[6] ............................... G06K 9/36; G06K 9/46
[52] U.S. Cl. .......................... 382/233; 382/236; 382/250
[58] Field of Search ..................................... 382/233, 232, 382/236, 250, 256, 298, 299, 300; 348/400, 401, 402, 412, 413, 415, 416, 420, 474

[56] References Cited

U.S. PATENT DOCUMENTS

| | | | |
|---|---|---|---|
| 4,805,017 | 2/1989 | Kaneko et al. | 348/401 |
| 5,325,374 | 6/1994 | Hoshi et al. | |
| 5,596,421 | 1/1997 | Shibata et al. | 386/126 |
| 5,635,985 | 6/1997 | Boyce et al. | 348/402 |

FOREIGN PATENT DOCUMENTS

| | | |
|---|---|---|
| 62-198268 | 9/1987 | Japan . |
| 62-295583 | 12/1987 | Japan . |
| 63-45684 | 2/1988 | Japan . |
| 1-213067 | 8/1989 | Japan . |
| 2-123830 | 5/1990 | Japan . |
| 3-10487 | 1/1991 | Japan . |
| 3-283989 | 12/1991 | Japan . |
| 4-35590 | 2/1992 | Japan . |

OTHER PUBLICATIONS

Hanamura et al. vol. 91, No. 477, A Proposal of Hierarchical Video Signal Coding Scheme to MPEGII, pp. 1–9 Dept. of Electronics and Communication Engineering, WASEDA University (Abstract attached).

P.N. Tudor, "Tutorial MPEG–2 Video Compression," Dec. 1995, pp. 257–264.

*Primary Examiner*—Phuoc Tran
*Attorney, Agent, or Firm*—Foley & Lardner

[57] ABSTRACT

A video reproducing apparatus which prevents a degradation in the picture quality by utilizing difference codes which have been added as additional information in coding process based DCT coding. Each of the taken-in codes has its header analyzed by a header analyzer 11, is decoded in a decoder 12, inverse-quantized in an inverse quantizer 13, and inverse-DCTed in an IDCT stage 14, thus yielding expanded pictures. If additional information has been added, the information is read by an additional information reader 21, the read difference codes contained in the extra information are expanded by an additional information decoder 22. The expanded difference code and video data from the IDCT stage 14 are synthesized by a video synthesizer 23 to yield high definition video data.

12 Claims, 12 Drawing Sheets

FIG. 3
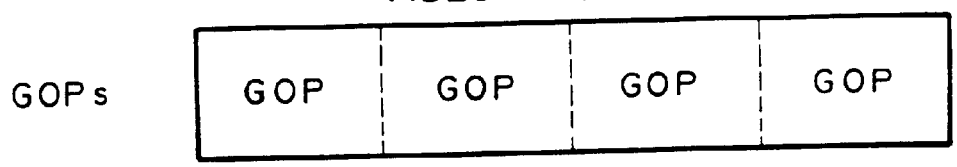
VIDEO SEQUENCE
GOPs
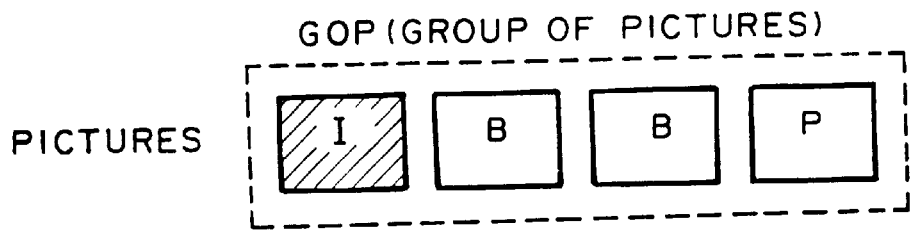
GOP (GROUP OF PICTURES)
PICTURES
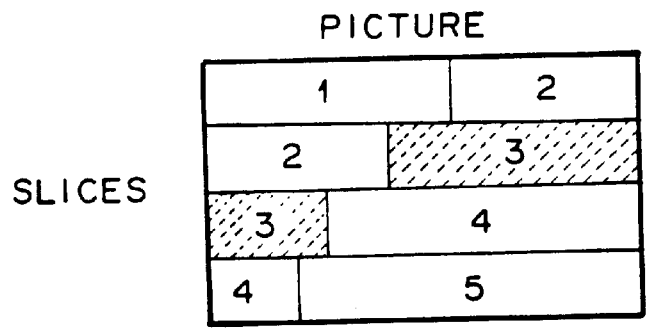
PICTURE
SLICES
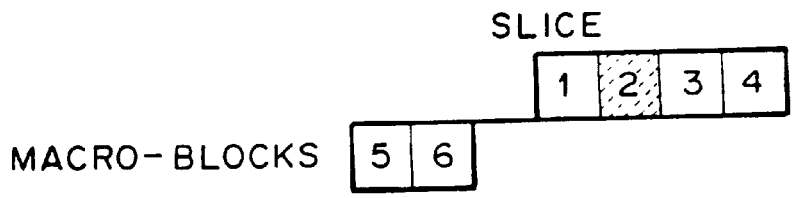
SLICE
MACRO-BLOCKS
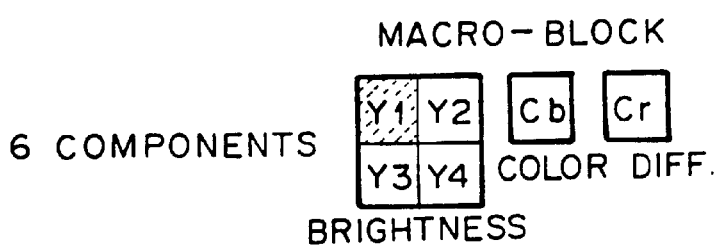
MACRO-BLOCK
6 COMPONENTS
BRIGHTNESS  COLOR DIFF.
BLOCK
8 × 8 PIXELS

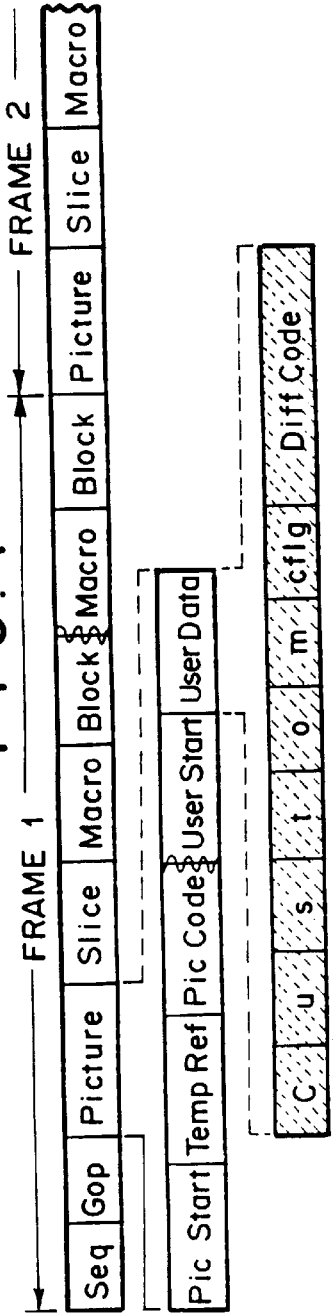

FIG. 4

(1) Seq : SEQUENCE HEADER
(2) Gop : GOP (GROUP OF PICTURE) HEADER
(3) Picture : PICTURE HEADER
(4) Slice : SLICE HEADER
(5) Macro : MACRO-BLOCK HEADER
(6) Block : BLOCK CODES
(7) PicStart : START CODE OF THE PICTURE HEADER
(8) TempRef : CODE INDICATIVE OF DISPLAY ORDER
(9) PicCode : DATA INDICATIVE OF PICTURE TYPE
(10) UserStart : CODE INDICATIVE OF PRESENCE OF USER DATA
(11) UserData : USER DATA
(12) "Custom" : IDENTIFIER ON PRESENCE OF ADDITIONAL INFORMATION
(13) cflg : FLAGS ON ADDITIONAL INFORMATION
(14) DiffCode : DIFFERENCE CODES

MSB 15 14 13 12 11 10 9 8 7 6 5 4 3 2 1 0 LSB

① B0 = 1 : PICTURE IS TO BE ENLARGED AT THE EXPANSION TIME
② B1 = 1 : DIFFERENCE CODES FOR I PICTURE HAVE BEEN ADDED
③ B2 = 1 : DIFFERENCE CODES FOR P PICTURE HAVE BEEN ADDED
④ B3 = 1 : DIFFERENCE CODES FOR B PICTURE HAVE BEEN ADDED

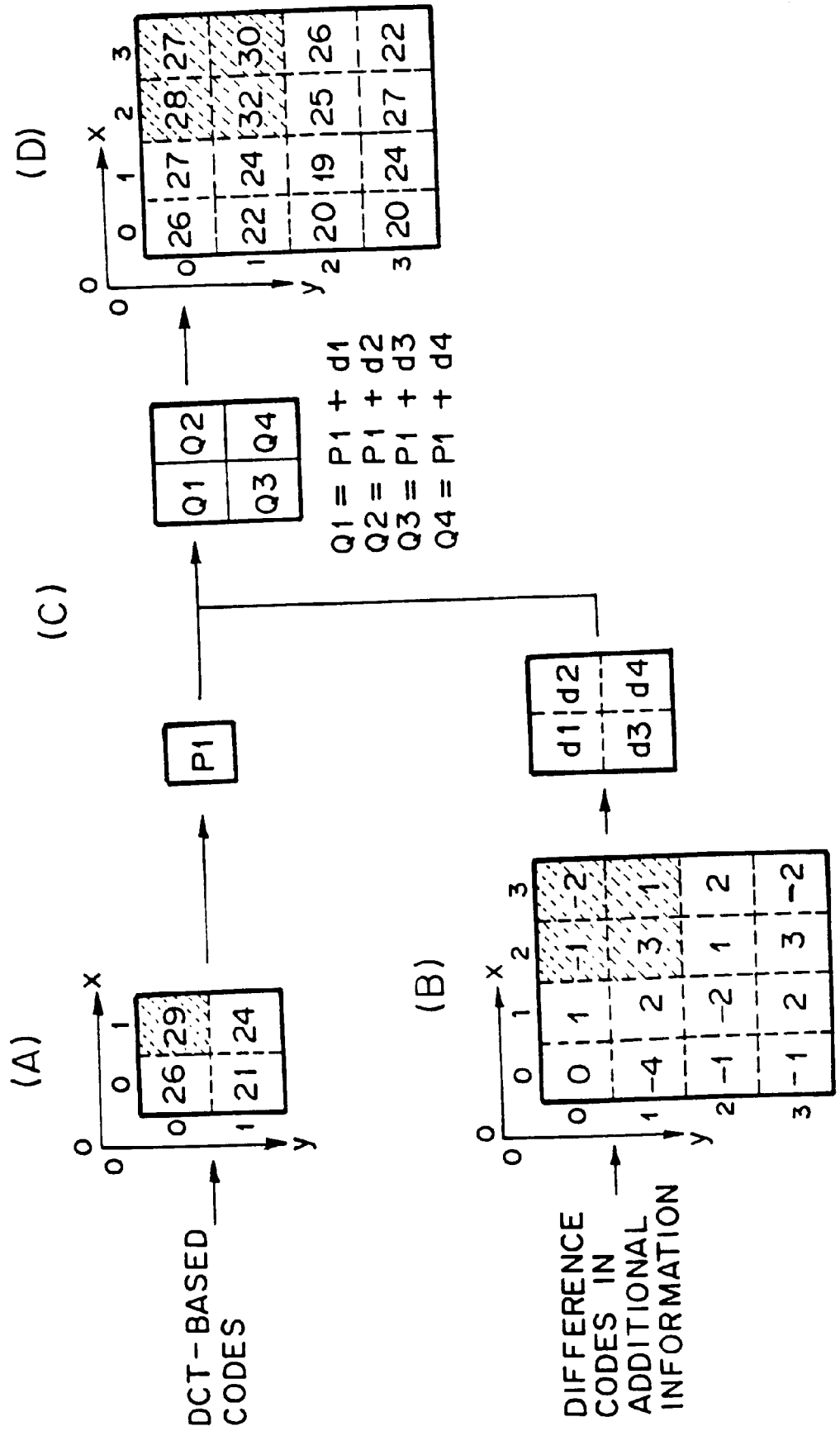

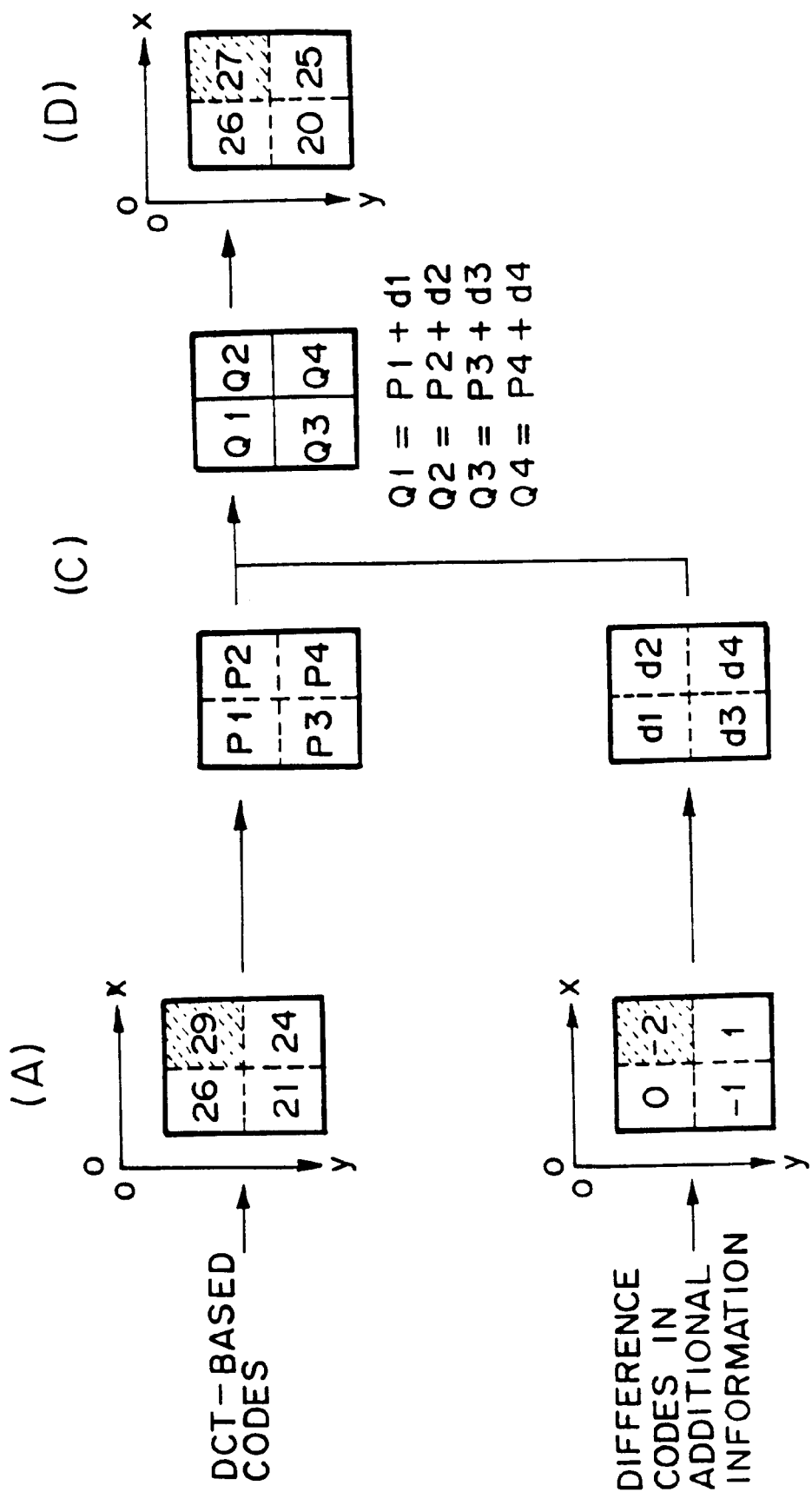

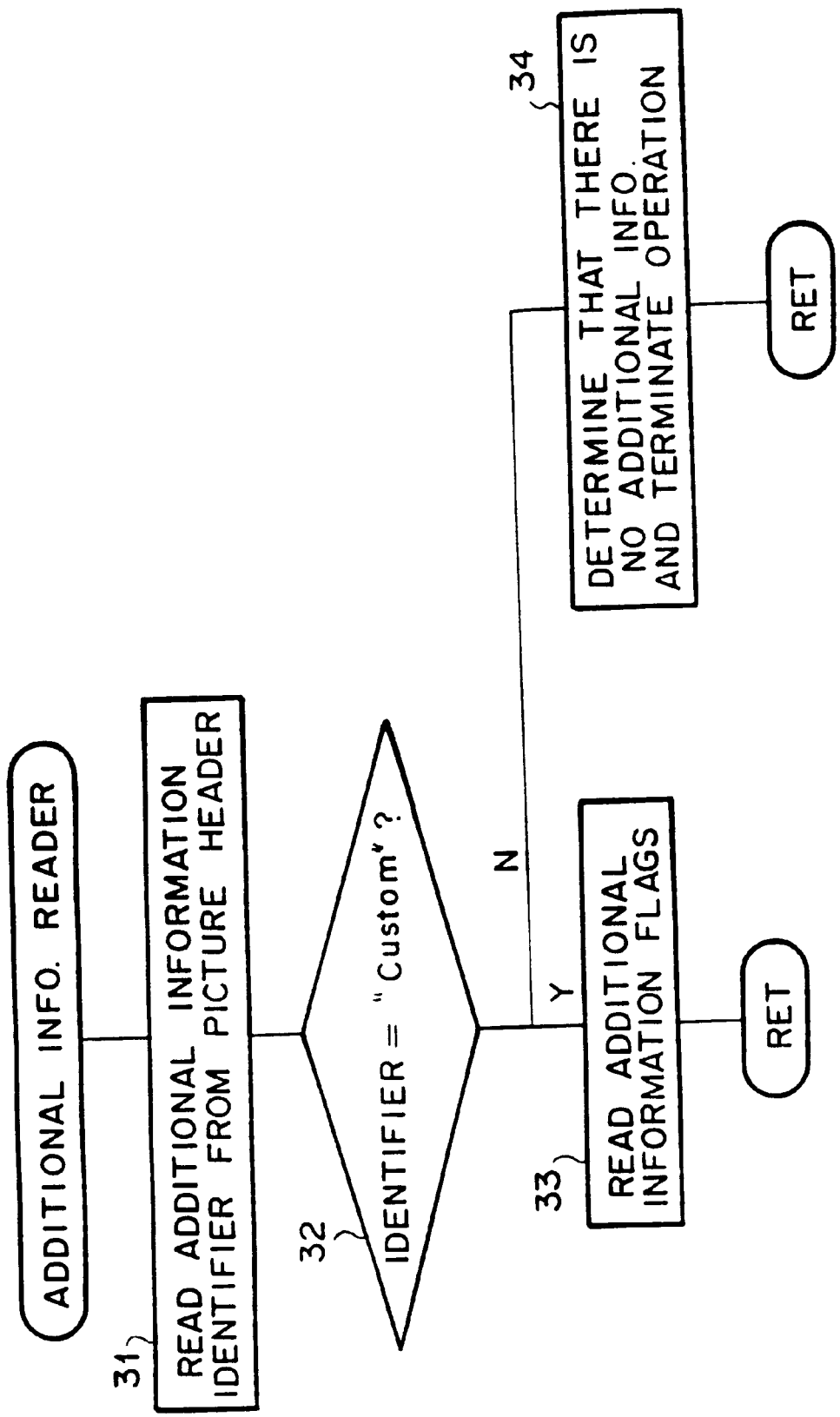

FIG.8

□ DENOTES 4-BIT VALUE

| IDENTIFIER | d1 | d2 | d3 | d4 | |
|---|---|---|---|---|---|
| 0 | □ | □ | □ | □ | EACH DIFFERENCE IS EXPRESSED BY AT 4-BITS OR LESS VALUE |
| 1 | □□ | □□ | □□ | □□ | EACH DIFFERENCE IS EXPRESSED BY MORE THAN 4-BITS VALUE |
| 2 | □ | | | | EACH DIFFERENCE IS EXPRESSED BY THE SAME AND AT 4-BITS OR LESS VALUE |
| 3 | □□ | | | | EACH DIFFERENCE IS EXPRESSED BY THE SAME AND MORE THAN 4-BITS VALUE |
| 4 | □ | □ | □□ | □□ | ONLY d1 AND d2 EACH ARE EXPRESSED BY AT 4-BITS OR LESS VALUE |
| 5 | □□ | □ | □ | □□ | ONLY d2 AND d3 EACH ARE EXPRESSED BY AT 4-BITS OR LESS VALUE |
| 6 | □□ | □□ | □ | □ | ONLY d3 AND d4 EACH ARE EXPRESSED BY AT 4-BITS OR LESS VALUE |

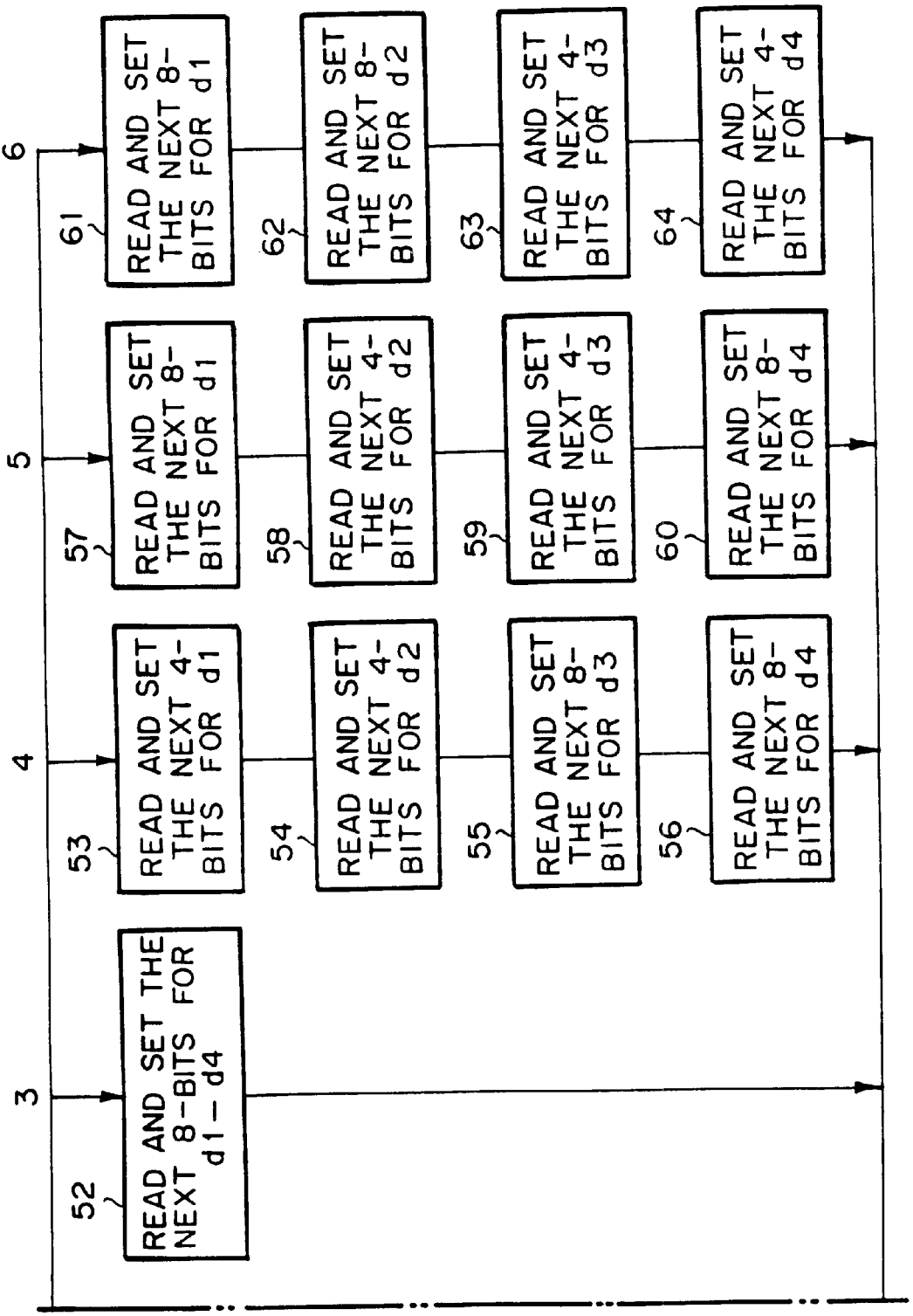

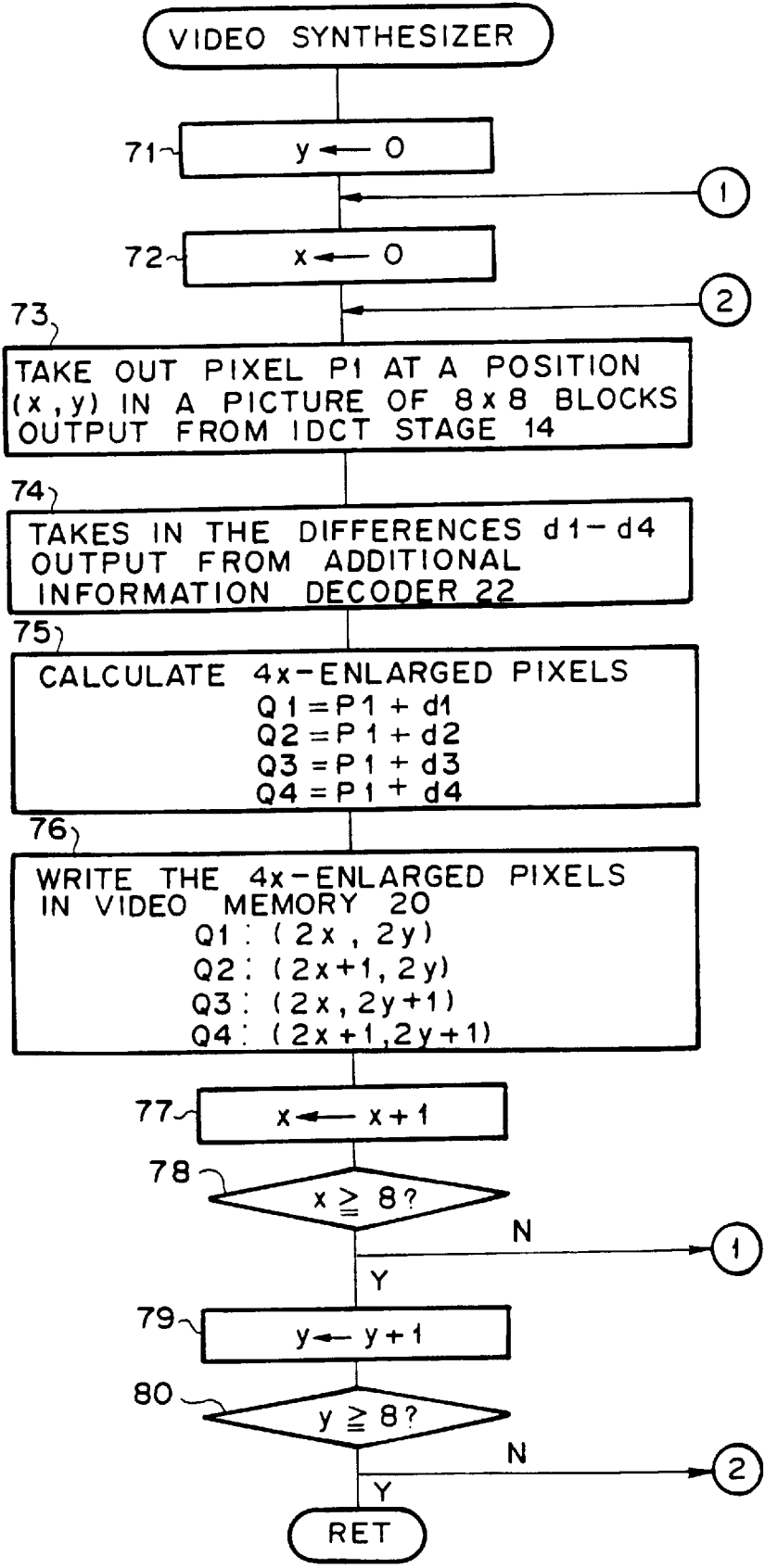

IMAGE REPRODUCING APPARATUS

BACKGROUND OF THE PRESENT INVENTION a). Field of the Present Invention

The present invention relates to an image reproducing apparatus for recovering a video signal from codes compressed and coded in such a coding method, based on the discrete cosine transform (hereinafter, referred to as "DCT") as JPEG and MPEG.

b). Description of the Prior Art

Images are usually compressed and coded when digitally recorded on a CD-ROM or hard disk because the image digitization would otherwise yield a huge amount of data.

DCT-based coding methods are more frequently used among compressing and coding methods. Such a method has been adopted to international standard coding methods such as JPEG (Joint Photographic Expert Group) and MPEG (Moving Pictures Expert Group).

A conventional DCT-based image recovering from a bitstream coded by means of a DCT-based coding method, e.g. an MPEG bitstream, will be described with reference to a drawing. FIG. 1 is a diagram illustrating how images are recovered from image codes based upon MPEG codes. In FIG. 1, each of the codes are read to analyze the type of the code in a header analyzer 1. In MPEG codes, the codes are divided into three types—the intra-frame encoded codes which constitute an intra-coded picture as I picture, the inter-frame encoded codes which are predicted only from a preceding frame to constitute a predictive coded picture as P picture, and the inter-frame encoded codes which are predicted from preceding and succeeding frames to constitute a bi-directionally predictive coded picture as B picture.

If the read codes are of an I picture: the codes, that is, efficiently compressed variable-length Huffman codes are decoded in a decoder 2 and inverse-quantized in an inverse quantizer 3; the values of pixels in blocks into which the picture has been divided are calculated by inverse DCT processing in an inverse DCT (IDCT) stage 4; and the calculated values or expanded video data are written in a video memory 10 to display the picture.

If the read codes are of a P picture: the codes are decoded in a decoder 2, and inverse-quantized in an inverse quantizer 3; differences of the blocks are calculated by inverse DCT processing in an inverse DCT (IDCT) stage 4; each difference is added by a forward predictor 7 to a corresponding motion-compensated block of a preceding frame stored in a preceding frame stage 5; the resultant expanded video data is written in a video memory 10 to display the image.

Also, if the read codes are of a B picture: the codes are decoded in a decoder 2, and inverse-quantized in an inverse quantizer 3; differences of the blocks are calculated by inverse DCT processing in an inverse DCT (IDCT) stage 4; each difference is added by a bi-directional predictor 8 or backward predictor 9 to a corresponding motion-compensated block of a preceding frame stored in a preceding frame stage 5 and a motion-compensated block of a succeeding frame stored in a succeeding frame stage 6; the resultant expanded video data is written in a video memory 10 to display the image.

As described above, any video reproducing system according to the international standard MPEG code can recover the image from MPEG codes. However, a high speed video reproduction is impossible without a high speed CPU because inverse DCT processing and decoding charge the CPU with a heavy load. For example, if a JPEG or MPEG video reproducing system is to process 15 frames every second, the reproducing system has to complete a frame of recovery processing for about 66 ms. If the reproducing system takes 20 ms for decoding huffman codes, 10 ms for inverse quantization, 30 ms for inverse DCT, and 20 ms for display, this means that the entire processing takes 80 ms, resulting in a 14 ms delay in reproducing a frame of image.

In order to reduce the load of CPU, there can be devised a method in which the image is compressed in coding and expanded in decoding, or a method in which the calculation period in the inverse DCT is reduced by assuming high frequency (HF) components to be zero. However, such a method would eliminate HF components of the image, and accordingly cause the image to become dim, thereby increasing a degradation in the picture quality.

An exemplary apparatus for reducing a degradation in the picture quality is disclosed in Japanese Patent Publication No. Sho62-198269 (1987). In the disclosed apparatus, images which are akin in picture quality to the original images are reproduced by masking non-sharpness of HF component reduced codes at the time of expansion to emphasize HF components.

However, there is a problem in such an apparatus that taking too much time for non-sharpness masking processes prevents a high speed video reproduction.

Also, in Japanese Patent Publication No. Sho62-295583 (1987), the differences between an original image and the reproduced image are calculated in advance by using the same kind image signal, noise signals with a signal distribution according to the distribution of the differences are generated after expansion, and randomly added to the reproduced image to reconstruct the reproduced image.

However, there is also a problem in such a coding scheme as described above that the noise signals have to be generated from some kinds of images, which in turn makes the structure of video reproducing system complicated.

Further, in Japanese Patent Publication No. Hei1-213067 (1989), the image is reproduced in such a way that each block is divided by every frequency band into sub-blocks, which are independently vector-quantized, and expanded sequentially from the lower to the higher in frequency so as to make the image gradually clear.

However, the above coding scheme disadvantageously takes much time to make a reproduced image clear, and accordingly can not afford a high speed video reproduction.

In Japanese Patent Publication No. Hei3-283989 (1991), detecting with respect to each of the blocks of an already coded image the fineness of a pattern, the position, direction and sharpness of an edge, or the position and direction of occurrence of an orthogonal transform coefficient of which the absolute value is not less than a predetermined threshold when an orthogonal transform performs an image signal to each the blocks, the image is reproduced by changing in response to the detected contents the way of scanning orthogonal transform coefficients for decoding and quantization.

However, if the coding method is partially changed in the course of image data compression as described above, the resultant codes will not be compatible with an international standard coding method. Thus, such codes disadvantageously need an image reproducing apparatus exclusively used for the code.

SUMMARY OF THE PRESENT INVENTION

It is therefore an object of the present invention to provide an image reproducing apparatus capable of reproducing the image from image codes based on DCT codes preventing a degradation in the picture quality by a simple arrangement without adding an extra load to the CPU.

According to an aspect of the present invention, a video reproducing apparatus reproduces moving pictures from compressed codes comprising intra-frame codes and inter-frame codes. Each of the moving pictures is divided into blocks. The intra-frame codes are obtained by applying a discrete cosine transform (DCT) to each of the blocks, quantizing and efficiently encoding the DCTed blocks. The inter-frame codes are obtained by making a motion compensation to each of the blocks by retrieving a block so as to minimize differences taken between the current and a preceding frames and between the current and a succeeding frames, taking a difference between each block of the current frame and the corresponding block of the motion-compensated frame, applying a discrete cosine transform (DCT) to each of the differences, quantizing and efficiently encoding the DCTed differences. The video reproducing apparatus comprises at least one or any combination of:

(a) means for analyzing each of the compressed codes and deciding whether difference codes between original pixels and corresponding expanded pixels have been added as additional information to each compressed code;

(b) means for adding the difference derived from the added difference code to a picture obtained from intra-frame codes; and (c) means for adding difference values derived from the added difference codes to a picture obtained from each of the inter-frame codes.

In an illustrative embodiment, the pictures may be scale down by reduction before the division into blocks. In this case, the pictures are scaled up in reproduction from the compressed codes. And, the video reproducing apparatus comprises at least one or any combination of:

(a) means for analyzing each of the compressed codes and deciding whether difference codes between original pixels and corresponding expanded and scaled-up pixels have been added as additional information to each compressed code.

(b) means for adding difference values derived from the added difference codes to a picture obtained from each of the intra-frame codes to provide a scaled-up version of the obtained picture.

(c) means for adding difference values derived from the added difference codes to a picture obtained from each of the inter-frame codes to provide a scaled-up version of the obtained picture.

BRIEF DESCRIPTION OF THE DRAWINGS

Further objects and advantages of the present invention will be apparent from the following description of the preferred embodiments of the present invention as illustrated in the accompanying drawings. In the drawings:

FIG. 3 is a diagram illustrating a hierarchical structure in a MPEG code;

FIG. 4 is a diagram showing the constitution of the MPEG code;

FIG. 5 is a diagram for explaining a process of addition of differences with a scale-up according to an aspect of the present invention;

FIG. 6 is a diagram for explaining a process of addition of differences without a scale-up according to an aspect of the present invention;

FIG. 7 is a flow diagram showing an operation of reading additional information according to an aspect of the present invention;

FIG. 8 is a diagram showing a structure of a difference code of the present invention;

FIGS. 9, 9A and 9B are flow diagram showing an operation of decoding additional information according to an aspect of the present invention;

FIG. 10 is a flow diagram showing an operation of addition of differences with a scale-up according to an aspect of the present invention.

DETAILED DESCRIPTION OF THE PREFERRED EMBODIMENTS

Figure 1:
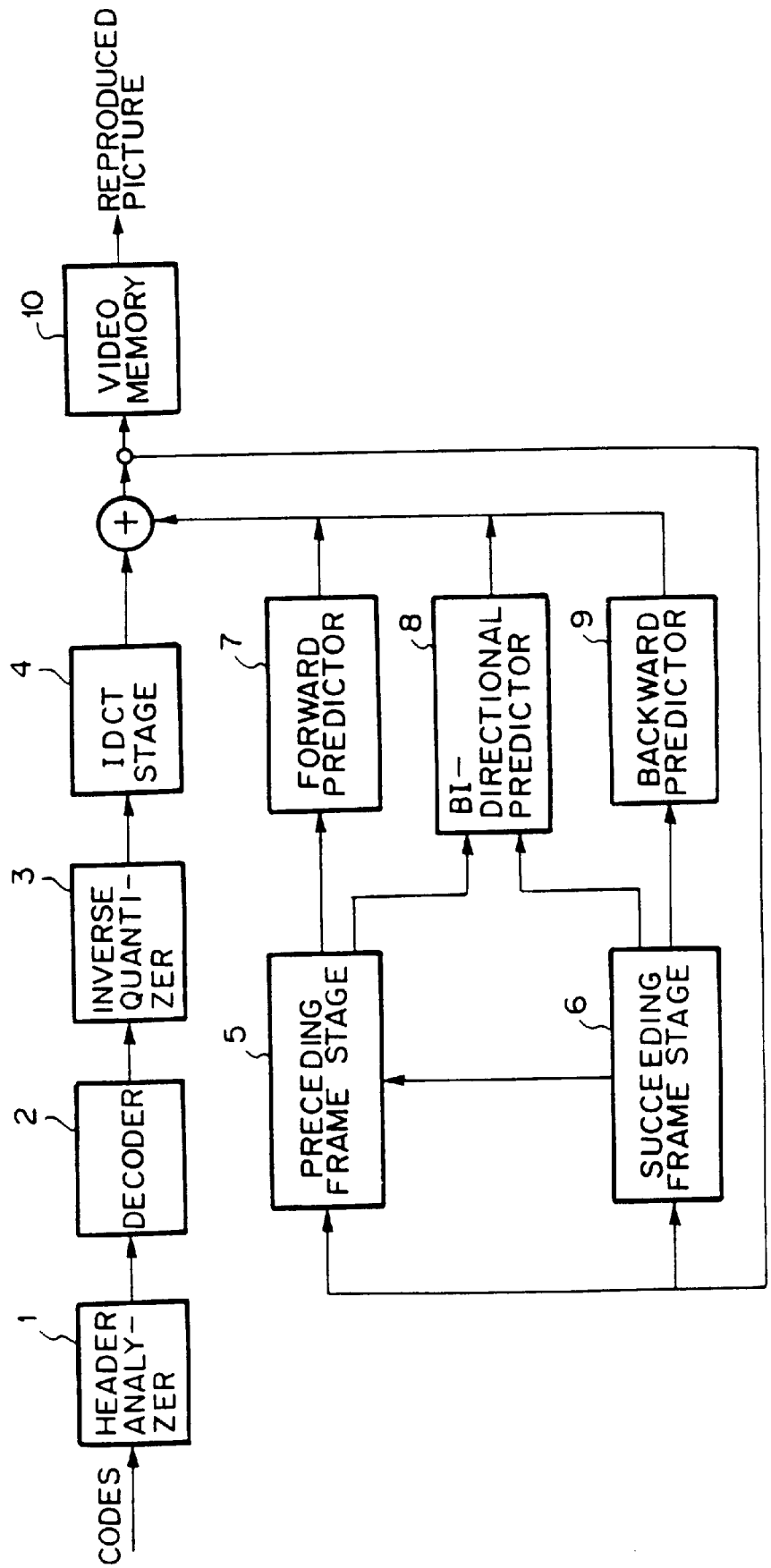
FIG. 1 is a block diagram of a moving picture reproducing apparatus of the prior art.
Figure 2:
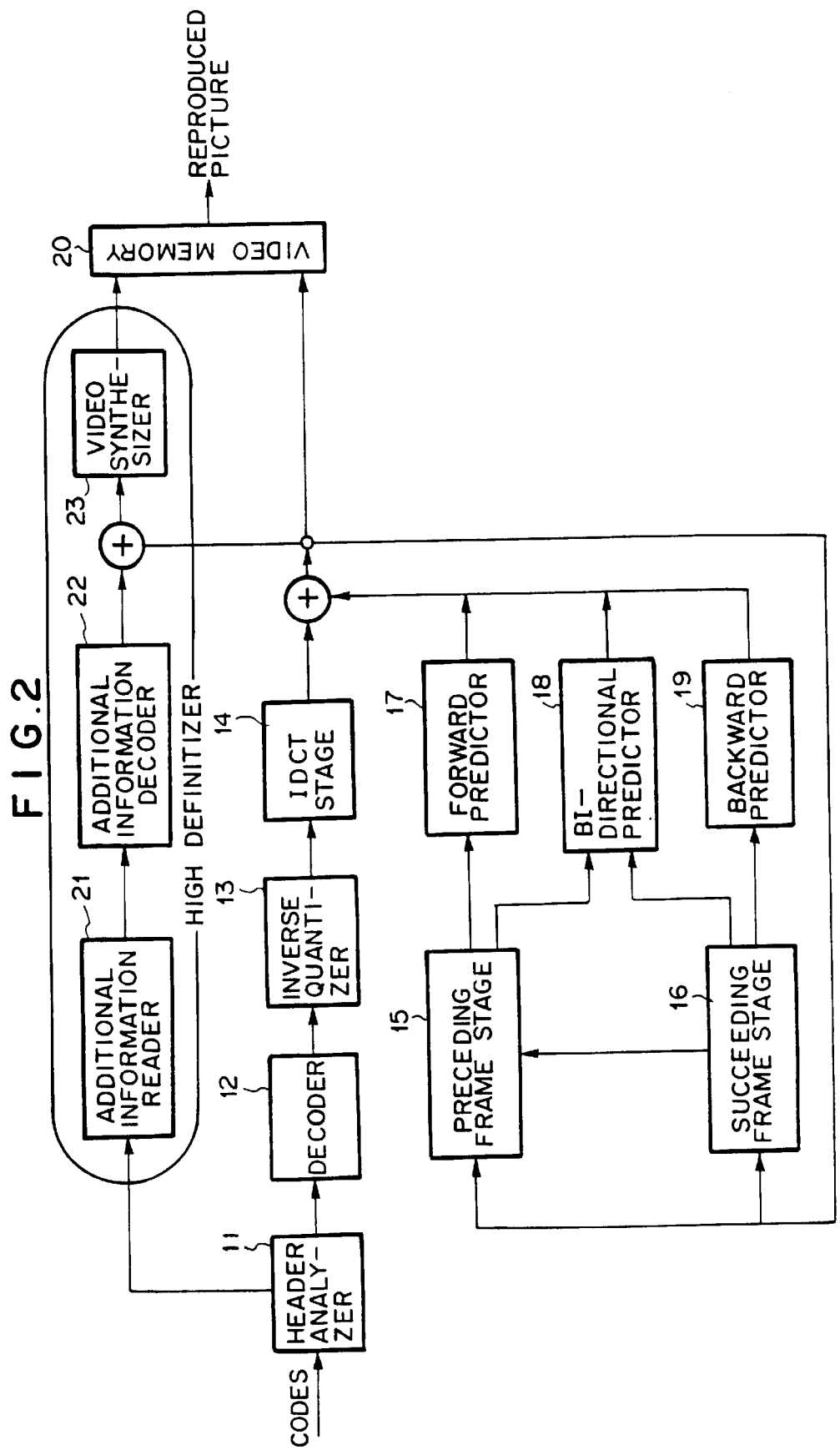
FIG. 2 is a schematic block diagram of an illustrative embodiment of a moving picture reproducing apparatus according to an aspect of the present invention.

Taking an MPEG bitstream as an example, the present invention will be described with reference to the drawings in the following. FIG. 2 is a block diagram of an illustrative embodiment of a moving picture reproducing apparatus of the present invention. In FIG. 2, the moving picture reproducing apparatus comprises a header analyzer 11, a decoder 12, an inverse quantizer 13, an IDCT (inverse DCT) stage 14, a preceding frame stage 15, a succeeding frame stage 16, a forward predictor 17, a bi-directional predictor 18, a backward predictor 19, a video memory 20, an additional information reader 21, an additional information decoder 22, and a video synthesizer 23. The video reproducing apparatus of the present embodiment reads in codes, and analyze the header of each code with the header analyzer 11. At this time, the apparatus decides whether additional information is added or not, and if so, performs high definition reproduction.

The video reproducing apparatus then expands the three kinds of codes: I pictures each comprising intra-frame codes, P pictures each comprising only forward predicted inter-frame encoded codes, and B pictures each comprising bi-directionally predicted inter-frame codes.

As for I pictures, each of the taken-in codes is decoded in the decoder 12 and inverse-quantized in the inverse quantizer 13, the value of the pixel block of the code is calculated by IDCT (inverse DCT) processing in the IDCT stage 14, and thus expanded picture is written in the video memory 20 for display.

As for P pictures, each of the taken-in codes is decoded in the decoder 12 and inverse-quantized in the inverse quantizer 13, a difference component between pixel blocks is calculated by IDCT (inverse DCT) processing in the IDCT stage 14, the difference is added by the forward predictor 17 to a motion-compensated block of a preceding frame stored in the preceding frame stage 15, and thus expanded picture is written in the video memory 20 for display.

As for B pictures, each of the taken-in codes is decoded in the decoder 12 and inverse-quantized in the inverse quantizer 13, a difference component between pixel blocks is calculated by IDCT (inverse DCT) processing in the IDCT stage 14, the difference is either added by the bi-directional predictor 18 to motion-compensated blocks of a preceding and a succeeding frame stored respectively in a preceding and a succeeding frame stage 15 and 16 or added by the backward predictor 19 to a motion-compensated block of a succeeding frame stored in a succeeding frame stage 16, and thus expanded picture is written in the video memory 20 for display.

If additional information has been added to the taken-in code, the additional information is read by the additional information reader 21, and the read difference code is decoded by the additional information decoder 22. The decoded read difference code and the video data from the IDCT stage 14 are synthesized by the video synthesizer 23, and then the synthesized video data is written in the video memory 20 for display.

A hierarchical structure of an exemplary code format in accordance with the MPEG standard is shown in FIG. 3. As shown in FIG. 3, the MPEG code has a hierarchical structure. The top layer of the structure is a video sequence consisting of a plurality of GOPs (groups of pictures). A picture corresponds to a sheet of image. Each picture is divided into a plurality of arbitrary areas called slices. Each slice consists of a plurality of macro-blocks disposed in a line from left to right and from up and down. Each of the macro-blocks consists of six components: four brightness components Y1 through Y4 representative of the brightness of four 8×8 dot blocks constituting the macro-block of 16×16 dots, and two color difference components Cb and Cr of 8×8 dot blocks coincided with a same area of the brightness for the macro-block. A block of 8×8 dots or pixels is a minimum unit in video coding.

FIG. 4 is a diagram showing the constitution of a code format according to the MPEG standard. In FIG. 4, each layer of every frame of the MPEG codes comprises (1) a sequence header, (2) a GOP (group of picture) header, (3) a picture header, (4) a slice header, (5) a macro-header, and (6) block codes.

In each picture, there is a user-definable user data field, shown as "UserData" (11) in FIG. 4, where there is stored a flag indicative of the addition of additional information to the UserData field. The user data comprises (12) an identifier "Custom" from which it is determined whether additional information has been added to the picture code, (13) addition information flags "cflg", and (14) difference codes "Diff-Code". The additional information flags consist of a bit B0 indicating that the picture is to be enlarged at the expansion time, a bit B1 indicating that difference codes for I picture have been added, a bit B2 indicating that difference codes for P picture have been added, and a bit B3 indicating that difference codes for B picture have been added.

Though additional information has been added to the picture heads in FIG. 4, additional information may be added to a user data filed or an expanded data field in any of the sequence header, the GOP header, the picture header and the slice header.

A video reproduction process will be described on the assumption of the above structure in the following.

FIG. 5 is a diagram for explaining a process of addition of differences with a scale-up of the picture. In FIG. 5, a picture of 2×2 pixels is enlarged twice in length and twice in breadth. FIG. 5(A) shows values of expanded versions of DCT-based codes for 2×2 pixels, FIG. 5(B) shows values of differences obtained by decoding difference codes of additional information, FIG. 5(C) shows a process of converting one pixel into 4 pixels, and FIG. 5(D) shows values of 4×4 pixels after the 2×2 enlargement. Each of the differences contained in additional information is a difference taken between a block of an original picture and a corresponding block of a picture obtained by reducing the original picture by one fourth, compressing the reduced original picture by means of a DCT-based coding method, and expanding the compressed reduced original picture. In FIG. 5, taking 1 code of a pixel from the picture (A) and 4 difference codes of four pixels from the picture (B), the code of the pixel is converted into 4 codes of four pixels as shown in (C), and the 4 codes are written in the corresponding blocks of the 2×2-enlarged picture (D).

As described above, the degradation in the picture quality can be reduced by adding the differences between an original picture and the compressed and expanded version processed by a DCT-based coding/decoding method to the compressed and expanded version.

For example, the code for the block at a position (1, 0) in FIG. 5(A) is converted by the following expressions shown below:

29−1=28 for the block at (2, 0),

29−2=27 for the block at (3, 0),

29+3=32 for the block at (2, 1), and

29+1=30 for the block at (3, 1).

In the example shown in FIG. 5, the scaling factors are 2×2. However, the scaling factor may be any integer more than 2.

FIG. 6 is a diagram for explaining a process of addition of differences without a scale-up. In FIG. 6, there is shown an example in which a picture of 2×2 blocks is reproduced. FIG. 6(A) shows block values to which DCT-based codes for 2×2 blocks have been expanded, FIG. 6(B) shows difference values into which difference codes in additional information has been decoded, FIG. 6(C) shows a process of converting the block values, and FIG. 6(D) shows the converted block values for the 2×2 blocks. Each of the differences contained in additional information is a difference taken between a block of an original picture and a corresponding block of a picture obtained by compressing the original picture by means of a DCT-based coding method, and expanding the compressed reduced original picture. In FIG. 6, taking 1 code of a pixel from the picture (A) and 1 difference code of a pixel from the picture (B), the code of the pixel is converted into another code as shown in (C), and the converted code is written in the corresponding block of the picture (D).

As described above, the degradation in the picture quality can be reduced by adding the differences between an original picture and the compressed and expanded version processed by a DCT-based coding/decoding method to the compressed and expanded version.

For example, the codes shown in FIG. 6(A) are converted by calculations according to the following expressions:

26+0=26 for the block at (0, 0),

29−2=27 for the block at (1, 0),

21−1=20 for the block at (0, 1), and

24+1=25 for the block at (1, 1).

FIG. 7 is a flow chart showing an operation of the additional information reader 21. In FIG. 7, the additional information reader 21 reads an identifier of additional information from the picture header (step 31) and determines whether the identifier is "Custom" or not (step 32). If not, the reader 21 determines that there is no additional information and terminates the operation (step 34). If the result is YES at step 32, then the reader 21 reads flags on the additional information (step 33).

FIG. 8 is a diagram showing a structure of a difference code. Each of difference codes consists of 4 differences d1 to d4 and an identifier, each of which is composed of 4-bit values, as shown in FIG. 8. The identifier defines the compositions of the 4 differences, that is, the number of bits for each of the differences. Specifically, an identifier whose value is 0 indicates that each value of the differences is expressed by at 4 bits or less, an identifier whose value is 1 indicates that each value of the differences is expressed by more than 4 bits, an identifier whose value is 2 indicates that each value of the differences is expressed by the same value and at 4-bit number or less, an identifier whose value is 3 indicates that each value of the differences is expressed by the same value and more than 4-bit number, an identifier whose value is 4 indicates that each value of only differences d1 and d2 is expressed by at 4 bits or less, an identifier whose value is 5 indicates that each value of only d2 and d3 is expressed by at 4 bits or less, and an identifier whose value is 6 indicates that each value of only d3 and d4 is expressed by at 4 bits or less.

Figure 9A:
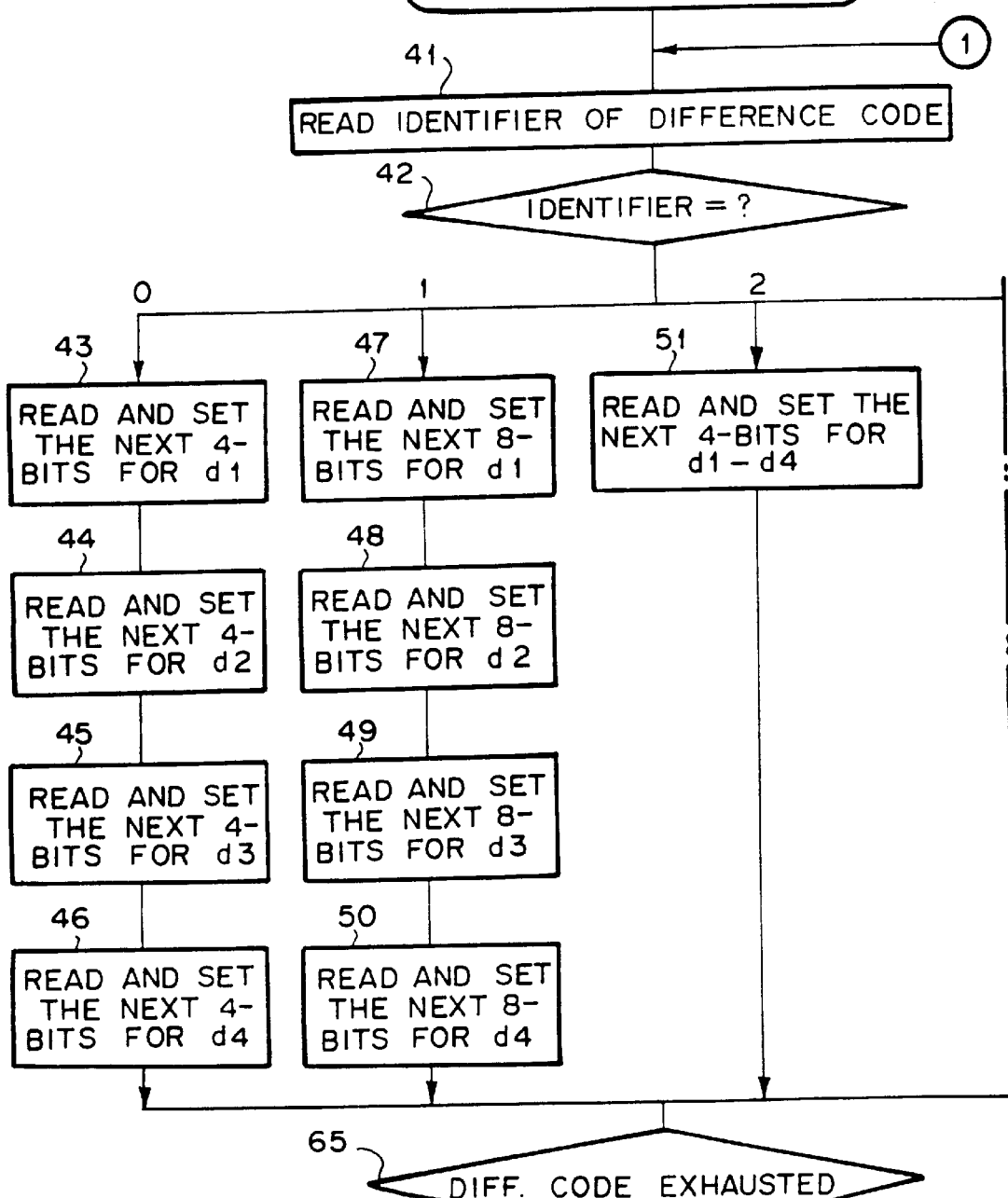
Figure 9:
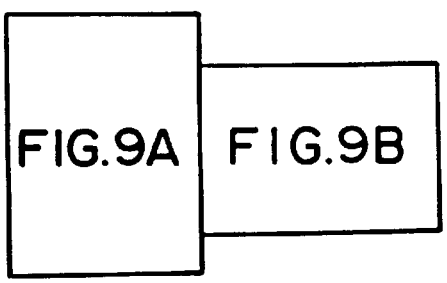

FIG. 9 is a flow chart showing an operation of the additional information decoder 22. In FIG. 9, the additional information decoder 22 begin operation by reading the first 4 bits (identifier) of a difference code (step 41), and decide next processes by a content of the identifier (step 42). If the identifier=0, the decoder 22 reads and sets the next 4 bits for the difference d1 (step 43), reads and sets the next 4 bits for the difference d2 (step 44), reads and sets the next 4 bits for d3 (step 45), and reads and sets the next 4 bits for d4 (step 46). If the identifier=1 in the decision step 42, then the decoder 22 proceeds to step 47, reads the 8 bits following the identifier in the difference code and sets the 8 bits for the difference d1 (step 47), reads and sets the next 8 bits for d2 (step 48), reads and sets the next 8 bits for d3 (step 49), and reads and sets the next 8 bits for d4 (step 50). If the identifier=2 in the decision step 42, then the decoder 22 proceeds to step 51 to read the 4 bits following the identifier in the difference code and set the 4 bits for the differences d1 to d4 (step 51). Also, if the identifier=3 in the decision step 42, then the decoder 22 proceeds to step 52 to read the 8 bits following the identifier in the difference code and set the 8 bits for the differences d1 to d4 (step 52). If the identifier=4 in the decision step 42, then the decoder 22 proceeds to step 53 to read the 4 bits following the identifier in the difference code and set the 4 bits for the difference d1 (step 53), reads and sets the next 4 bits for d2 (step 54), reads and sets the next 8 bits for d3 (step 55), and reads and sets the next 8 bits for d4 (step 56). If the identifier=5 in the decision step 42, then the decoder 22 proceeds to step 57 to read the 8 bits following the identifier in the difference code and set the 8 bits for the difference d1 (step 57), reads and sets the next 4 bits for d2 (step 58), reads and sets the next 4 bits for d3 (step 59), and reads and sets the next 8 bits for d4 (step 60). If the identifier=6 in the decision step 42, then the decoder 22 proceeds to step 61 to read the 8 bits following the identifier in the difference code and set the 8 bits for the difference d1 (step 61), reads and sets the next 8 bits for d2 (step 62), reads and sets the next 4 bits for d3 (step 63), and reads and sets the next 4 bits for d4 (step 64). After completing any of the steps 46, 50, 51 to 52, 56, 60 and 64, the additional information decoder 22 proceeds to the decision step 65 to determine whether the difference code is exhausted. If so, the operation is terminated. Otherwise, if not, the control is passed to step 41.

In the example shown in FIGS. 8 and 9, decoding is so executed as to provide difference values each of which consists of 4×i bits (i=1, 2 . . . ). However, the difference values may be any variable length values of at least 2 bits.

FIG. 10 is a flow diagram showing an operation by the video synthesizer 23 for adding the differences to each of the expanded pictures to enlarge the expanded picture to 4 times the original size. In FIG. 10, the video synthesizer 23 begins an operation by putting 0 to a variable y (step 71), and then puts 0 to a variable x (step 72).

The video synthesizer 23 then takes out an expanded pixel P1 from 8×8 blocks output by the IDCT stage 14 (step 73). The position where the pixel P1 is taken out is shown as:

P1: (x, y).

It should be noted that the output picture from the IDCT (inverse DCT) stage 14 is any of I, P and B pictures. The output picture is: in case of an I picture, a one in which the values of the blocks have been calculated through decoding by the decoder 12, inverse-quantizing by the inverse quantizer 13 and IDCTing by the IDCT stage 14; in case of a P picture, a one which has been obtained by calculating the differences through decoding by the decoder 12, inverse-quantizing by the inverse quantizer 13 and IDCTing by the IDCT stage 14, and adding the differences, by a forward predictor 17, to the motion-compensated blocks of a preceding frame stored in a preceding frame stage 15; in case of a B picture, a one which has been obtained by calculating the differences through decoding by the decoder 12, inverse-quantizing by the inverse quantizer 13 and IDCTing by the IDCT stage 14, and adding the differences, by a bi-directional predictor 18 or a backward predictor 19, either to the motion-compensated blocks of a preceding frame stored in a preceding frame stage 15 and the motion-compensated blocks of a succeeding frame stored in a succeeding frame stage 16 or only to the latter motion-compensated blocks.

Next, the video synthesizer 23 takes in the differences d1 to d4 output from the additional information decoder 22 (step 74).

The video synthesizer 23 then performs the following calculations to yield 4×-enlarged pixels Q1 to Q4 for which the enlargement is done holding down a degradation in the picture quality (step 75).

$Q1 = P1 + d1$ $Q2 = P1 + d2$ $Q3 = P1 + d3$ $Q4 = P1 + d4$

The 4×-enlarged pixels are written in the video memory 20 (step 76). At this time, the pixels are written in the following positions:

Q1: (2x, 2y)

Q2: (2x+1, 2y)

Q3: (2x, 2y+1)

Q4: (2x+1, 2y+1).

Next, the video synthesizer 23 increments the variable x (step 77), and determines if the variable x is equal to or larger than 8 (step 78). If not, the flow returns to step 72. If the result in step 78 is YES, the synthesizer 23 increments the variable y (step 79) to judge whether the variable y is equal to or larger than 8 or not (step 80). If not, the flow returns to step 73. If the result in step 80 is YES, the operation is terminated.

Though the synthesized pictures are stored in a video memory 20 for display use in the example of FIG. 10, the pictures may be stored in any other memory media such as a hard disk.

Figure 11:
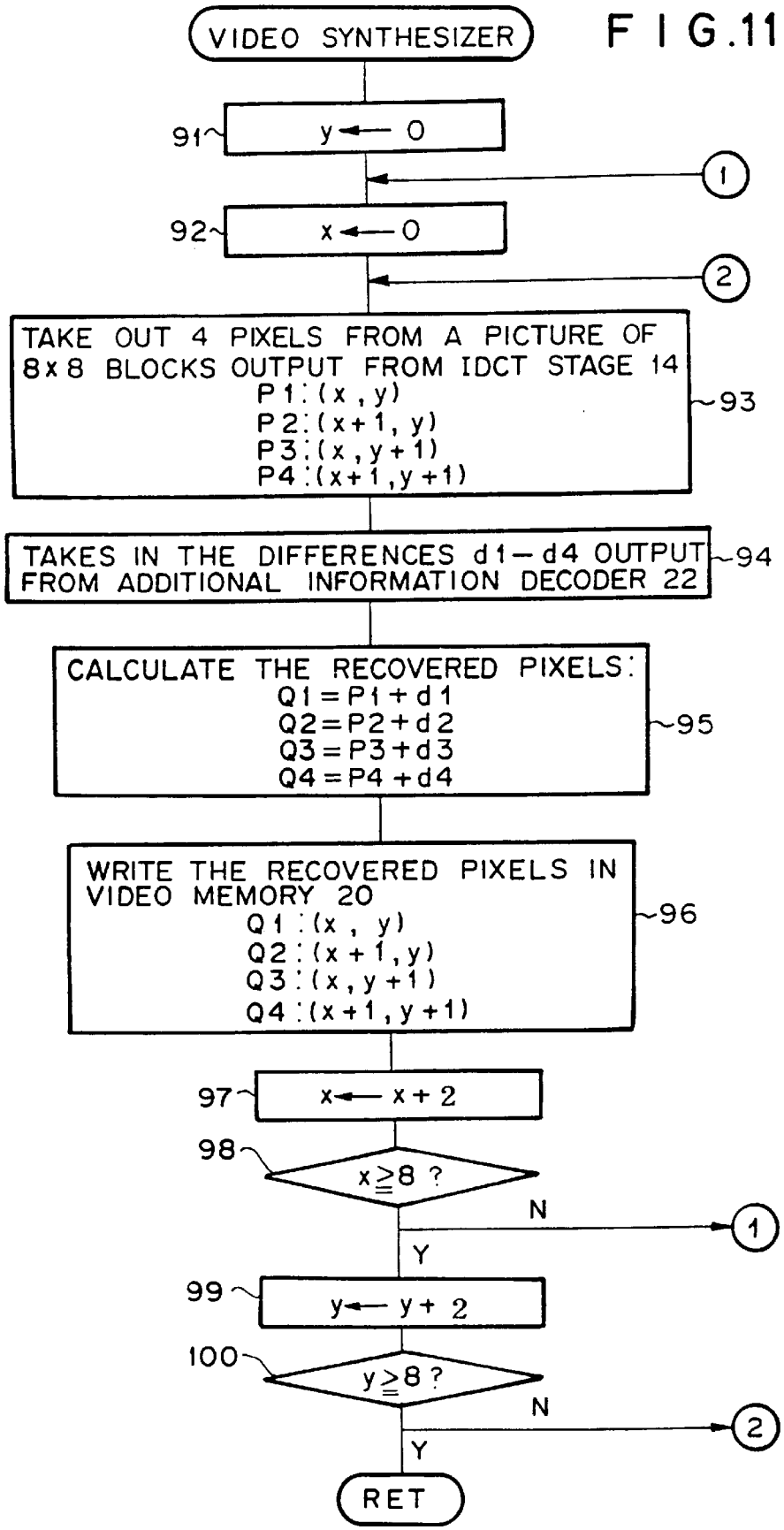
FIG. 11 is a flow diagram showing an operation of addition of differences without a scale-up according to an aspect of the present invention.

FIG. 11 is a flow diagram showing an operation by the video synthesizer 23 for adding the differences to each of the expanded pictures without scaling up the expanded pictures. In FIG. 11, the video synthesizer 23 first substitutes 0s for the variables x and y (steps 91 and 92, respectively).

Next, the video synthesizer 23 then takes out four expanded pixels P1 to P4 from a picture of 8×8 blocks output by the IDCT stage 14 (step 93). The positions where the pixels P1 to P4 are taken out are shown in the following:

P1: (x, y)
P2: (x+1, y)
P3: (x, y+1)
P4: (x+1, Y+1)

It should be noted that the output picture from the IDCT (inverse DCT) stage 14 is any of I, P and B pictures. The output picture is: in case of an I picture, a one in which the values of the blocks have been calculated through decoding by the decoder 12, inverse-quantizing by the inverse quantizer 13 and IDCTing by the IDCT stage 14; in case of a P picture, a one which has been obtained by calculating the differences through decoding by the decoder 12, inverse-quantizing by the inverse quantizer 13 and IDCTing by the IDCT stage 14, and adding the differences, by a forward predictor 17, to the motion-compensated blocks of a preceding frame stored in a preceding frame stage 15; in case of a B picture, a one which has been obtained by calculating the differences through decoding by the decoder 12, inverse-quantizing by the inverse quantizer 13 and IDCTing by the IDCT stage 14, and adding the differences, by a bi-directional predictor 18 or a backward predictor 19, either to the motion-compensated blocks of a preceding frame stored in a preceding frame stage 15 and the motion-compensated blocks of a succeeding frame stored in a succeeding frame stage 16 or only to the latter motion-compensated blocks.

Next, the video synthesizer 23 takes in the differences d1 to d4 output from the additional information decoder 22 (step 94).

The video synthesizer 23 then calculates pixels Q1 to Q4 holding down a degradation in the picture quality (step 95). The calculation is executed according to the following expressions:

$$Q1=P1+d1$$
$$Q2=P2+d2$$
$$Q3=P3+d3$$
$$Q4=P4+d4$$

Next, the recovered (converted) pixels are written in the video memory 20 (step 96). At this time, the pixels are written in the following positions:

Q1: (x, y)
Q2: (x+1, y)
Q3: (x, y+1)
Q4: (x+1, y+1)

Next, the video synthesizer 23 adds the variable x and 2 (step 97), and determines whether the variable x is equal to or larger than 8 or not (step 98). If not, the flow returns to step 92. If the result in step 98 is YES, the video synthesizer 23 adds the variable y and 2 (step 99) to see and determine whether the variable y is equal to or larger than 8 or not (step 100). If not, the flow returns to step 93. If the result in step 100 is YES, the operation is terminated.

Though the synthesized pictures are stored in a video memory for display use in the example of FIG. 11, the pictures may be stored in any other memory media such as a hard disk.

As described above, the present invention makes it possible to reproduce pictures preventing a degradation in the picture quality without adding an extra load to the CPU of the video reproducing apparatus. Furthermore, since the present invention effectively is, for example, in accordance with an international standard coding method, the present invention enables any video reproducing apparatus based on the international standard to reproduce pictures though the quality of pictures may change depending on the apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. A video reproducing apparatus comprising:
    means for reproducing moving pictures from compressed codes including intra-frame codes and inter-frame codes to output a reproduced signal,
    wherein each of said moving pictures is divided into blocks,
    wherein said intra-frame codes are obtained by applying a discrete cosine transform (DCT) to each of said blocks, quantizing and efficiently encoding said DCTed blocks, and
    wherein said inter-frame codes are obtained by making a motion compensation to each of said blocks by retrieving a block so as to minimize differences taken between the current and a preceding frame and between the current and a succeeding frame, taking a difference between each block of the current frame and the corresponding block of the motion-compensated frame, applying a discrete cosine transform (DCT) to each of said differences, quantizing and efficiently encoding said DCTed differences;
    analyzing means for analyzing each of said compressed codes, deciding whether difference codes between original pixels and corresponding expanded pixels that have not been subjected to said DCT have been added as additional information to said each compressed code in a picture header and for reading an identifier in said additional information for defining the structure of difference codes in said additional information; and
    processing means for performing an inverse DCT for frames of said compressed codes that do not have said additional information included therein, and for not performing said inverse DCT for portions of frames of said compressed codes that correspond to additional information.

2. The image reproducing defined in claim 1 further comprising:
    means for adding difference values derived from said added difference codes to a picture obtained from each of said intra-frame codes.

3. The image reproducing defined in claim 1 further comprising:
    means for adding difference values derived from said added difference codes to a picture obtained from each of said inter-frame codes.

4. The image reproducing defined in claim 1 wherein said decision means comprises:
    means for extracting codes from a predetermined header of each of said compressed codes; and
    means for decoding said extracted codes from said extracting means.

5. The image reproducing defined in claim 4 wherein said decision means further comprises:

means for adding the output from said decoding means to said reproduced signal.

6. The image reproducing defined in claim 5 further comprising:

means for synthesizing a video signal from the output from said adding means.

7. A video reproducing apparatus comprising:

means for reproducing moving pictures from compressed codes comprising intra-frame codes and inter-frame codes and scaling up said reproduced moving pictures, wherein each of said moving pictures is reduced by thinning-out pixels, and divided into blocks, wherein said intra-frame codes are obtained by applying a discrete cosine transform (DCT) to each of said blocks, quantizing and efficiently encoding said DCTed blocks, and wherein said inter-frame codes are obtained by making a motion compensation to each of said blocks by retrieving a block so as to minimize differences taken between the current and a preceding frame and between the current and a succeeding frame, taking a difference between each block of the current frame and the corresponding block of the motion-compensated frame, applying a discrete cosine transform (DCT) to each of said differences, quantizing and efficiently encoding said DCTed differences;

means for analyzing each of said compressed codes, deciding whether difference codes between original pixels and corresponding expanded and scaled-up pixels that have not been subjected to said DCT have been added as additional information to said each compressed code in a picture header and for reading an identifier in said additional information for defining the structure of difference codes in said additional information; and processing means for performing an inverse DCT for frames of said compressed codes that do not have said additional information included therein, and for not performing said inverse DCT for portions of frames of said compressed codes that correspond to additional information.

8. The image reproducing defined in claim 7 further comprising:

means for adding difference values derived from said added difference codes to a picture obtained from each of said intra-frame codes to provide a scaled-up version of said picture.

9. The image reproducing defined in claim 7 further comprising:

means for adding difference values derived from said added difference codes to a picture obtained from each of said inter-frame codes to provide a scaled-up version of said picture.

10. The video reproducing apparatus defined in claim 1 further comprising:

means for adding difference values derived from added difference codes to a picture obtained from each of intra-frame codes.

11. The video reproducing apparatus defined in claim 1 further comprising:

means for adding difference values derived from added difference codes to a picture obtained from each of inter-frame codes.

12. A video reproducing apparatus for reproducing moving pictures from compressed codes including intra-frame codes and inter-frames codes to output a reproduced signal, comprising:

a header analyzer configured to receive compressed codes, to analyze a header of each code, and to decide whether or not additional information has been added;

a decoder connected to said header analyzer and configured to decode compressed variable-length Huffman codes for each said code;

an inverse quantizer configured to perform inverse-quantizing of signals output from said decoder;

an inverse DCT stage configured to transform values of pixels in blocks of signals output from said inverse quantizer, and to calculate values and expanded video data;

a video memory configured to store reproduced video signals;

a forward predictor configured to provide motion-compensating blocks of a preceding frame stored in a preceding frame stage;

a bi-directional predictor configured to provide motion-compensating blocks of a preceding frame stored in the preceding frame stage and block of a succeeding frame stored in a succeeding frame stage;

a backward predictor configured to provide motion-compensating blocks of the succeeding frame stored in the succeeding frame stage;

a first adder for adding an output signal of said inverse DCT stage and one of output signals of said forward predictor, said bi-directional predictor and said backward predictor, and outputting first added results to said video memory, the preceding frame stage and the succeeding frame stage;

an additional information reader configured to read the additional information of each header analyzed by said header analyzer;

an additional information decoder coupled to said additional information reader and configured to decode the additional information based upon a value of an identifier in said additional information for defining the structure of difference codes in said additional information;

a second adder for adding, as second added results, a decoded output of said additional information decoder with the first added results; and a video synthesizer configured to synthesize the second added results and to write the synthesized second added results to said video memory, wherein said additional information reader analyzes each of the additional information in said each compressed code and decides whether difference codes between original pixels and corresponding expanded pixels have been added as the additional information to said each compressed code.

* * * * *